United States Patent
Tojo et al.

(10) Patent No.: US 8,325,412 B2
(45) Date of Patent: Dec. 4, 2012

(54) LIGHT SOURCE APPARATUS

(75) Inventors: Ryo Tojo, Hachioji (JP); Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 433 days.

(21) Appl. No.: 12/760,018

(22) Filed: Apr. 14, 2010

(65) Prior Publication Data

US 2010/0264829 A1 Oct. 21, 2010

(30) Foreign Application Priority Data

Apr. 17, 2009 (JP) .................................. 2009-101097

(51) Int. Cl.
G02F 2/02 (2006.01)
G02B 6/02 (2006.01)
H05B 37/02 (2006.01)
(52) U.S. Cl. .......................... 359/326; 382/123; 315/134
(58) Field of Classification Search .................. 315/224, 315/246, 291, 307, 134, 151; 385/4–5, 8–9, 385/27–28, 31–32; 359/326, 328
See application file for complete search history.

(56) References Cited

U.S. PATENT DOCUMENTS

| 7,034,988 B2 * | 4/2006 | Tamai et al. | 359/326 |
| 7,164,830 B2 * | 1/2007 | Hiroishi et al. | 385/123 |
| 7,433,115 B2 * | 10/2008 | Hama et al. | 359/326 |
| 7,505,655 B2 * | 3/2009 | Yamazaki et al. | 385/123 |

FOREIGN PATENT DOCUMENTS

JP 2008-122838 5/2008

* cited by examiner

*Primary Examiner* — Minh D A
(74) *Attorney, Agent, or Firm* — Scully, Scott, Murphy & Presser, PC

(57) ABSTRACT

A light source apparatus includes an excitation-light source, a first light guiding member and a second light guiding member which guide excitation light emitted from the excitation-light source, a wavelength converting member which is installed near an emitting end of excitation light from the excitation-light source of the first light guiding member and the second light guiding member, and which receives excitation light which has been guided by one of the first light guiding member and the second light guiding member, and emits a wavelength-converted light of a wavelength different from a wavelength of the excitation light, a first light receiving element which is installed near the wavelength converting member, and which directly or indirectly receives the wavelength-converted light of which, the wavelength is converted by the wavelength converting member, and an optical path switching section which guides the excitation light to one of the first light guiding member and the second light guiding member according to an output of the first light receiving element.

21 Claims, 15 Drawing Sheets

LIGHT SOURCE APPARATUS

CROSS-REFERENCE TO RELATED APPLICATION

The present application is based upon and claims the benefit of priority from the prior Japanese Patent Application No. 2009-101097 filed on Apr. 17, 2009; the entire contents of which are incorporated herein by reference.

BACKGROUND OF THE INVENTION

1. Field of the Invention

The present invention relates to a light source apparatus in which, an optical fiber is used.

2. Description of the Related Art

A light source apparatus in which, an optical fiber is used as described in Japanese Patent Application Laid-open Publication No. 2008-122838 has hitherto been known. FIG. 15 is a diagram showing a schematic structure of a conventional light source apparatus 200.

The light source apparatus 200 is capable of illuminating an interior of an object to be illuminated having a complicated structure, by bending an optical fiber 230a. However, the optical fiber 230a being a member having a low mechanical strength, might break and not guide light. As a means for detecting disconnecting of the optical fiber 230, a method in which, wavelength-converted light emerged from an optical converting section 210 is guided by a second optical fiber 230b, and is detected by a light receiving element 245 which is connected to the second optical fiber 230b has been known.

However, in the abovementioned method, when breaking of the optical fiber 230a occurs, although the disconnecting can be detected, either the repair work is to be carried out upon discontinuing the use of the light source apparatus, or a new light source apparatus is to be arranged and used, thereby causing inconvenience to a user.

The present invention is made in view of the abovementioned circumstances, and an object of the present invention is to provide a light source which can be used continuously even when an optical fiber is degraded or disconnected, thereby lowering intensity of illuminating light, or becoming incapable of illuminating.

SUMMARY OF THE INVENTION

A light source apparatus of the present invention includes an excitation-light source, a first light guiding member and a second light guiding member which guide excitation light emitted from the excitation-light source, a wavelength converting member which is installed near an emitting end of excitation light from the excitation-light source of the first light guiding member and the second light guiding member, and which receives excitation light which has been guided by one of the first light guiding member and the second light guiding member, and emits a wavelength-converted light of a wavelength different from a wavelength of the excitation light, a first light receiving element which is installed near the wavelength converting member, and which directly or indirectly receives the wavelength-converted light of which, the wavelength is converted by the wavelength converting member, and an optical-path switching section which guides the excitation light to one of the first light guiding member and the second light guiding member according to an output of the first light receiving element.

DETAILED DESCRIPTION OF THE PREFERRED EMBODIMENTS

Exemplary embodiments and modified embodiments of a light source apparatus according to the present invention will be described below in detail by referring to the accompanying diagrams. However, the present invention is not restricted by the embodiments and the modified embodiments described below.

First Embodiment

Excitation-Light Source, Excitation-Light Guiding Member

Figure 1:
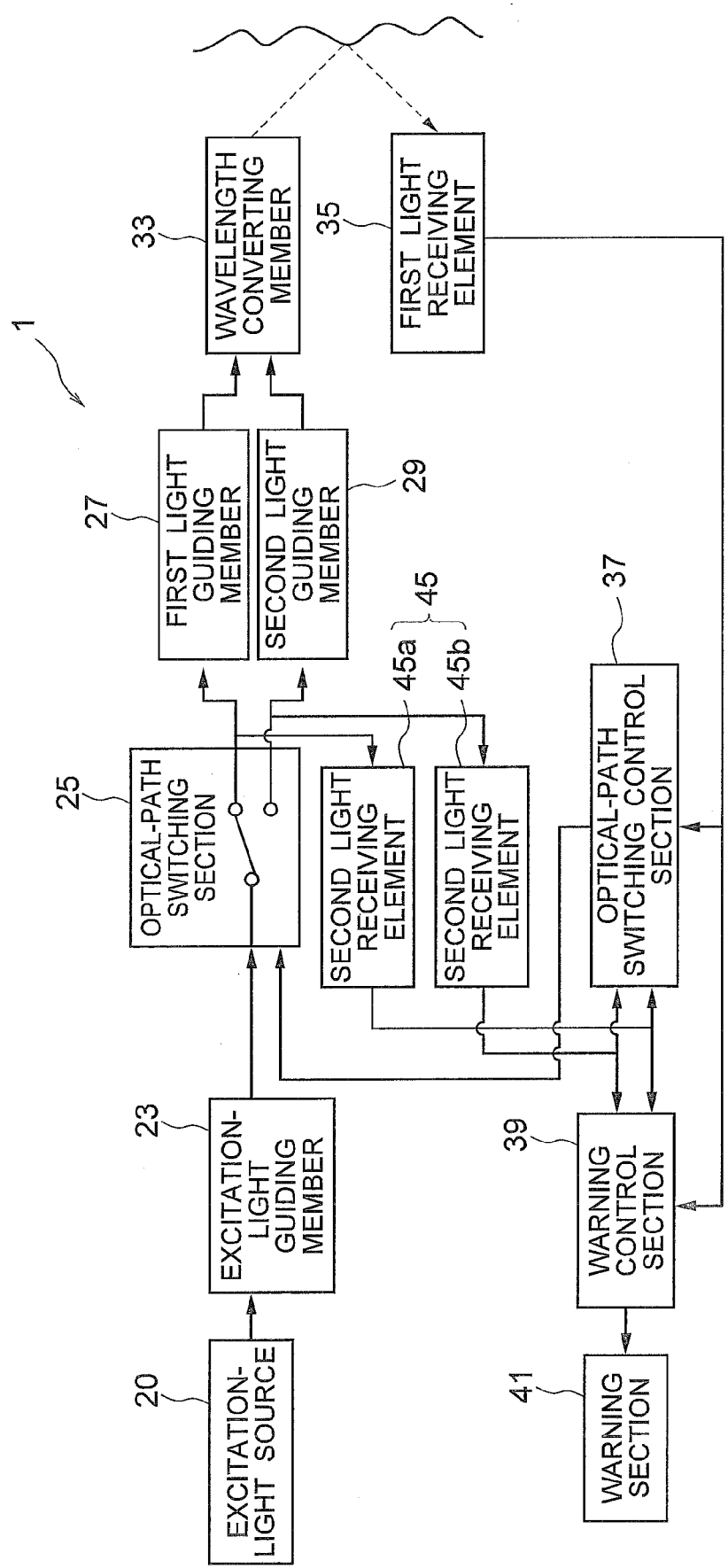
FIG. 1 is a block diagram of a light source apparatus according to a first embodiment of the present invention.
Figure 2:
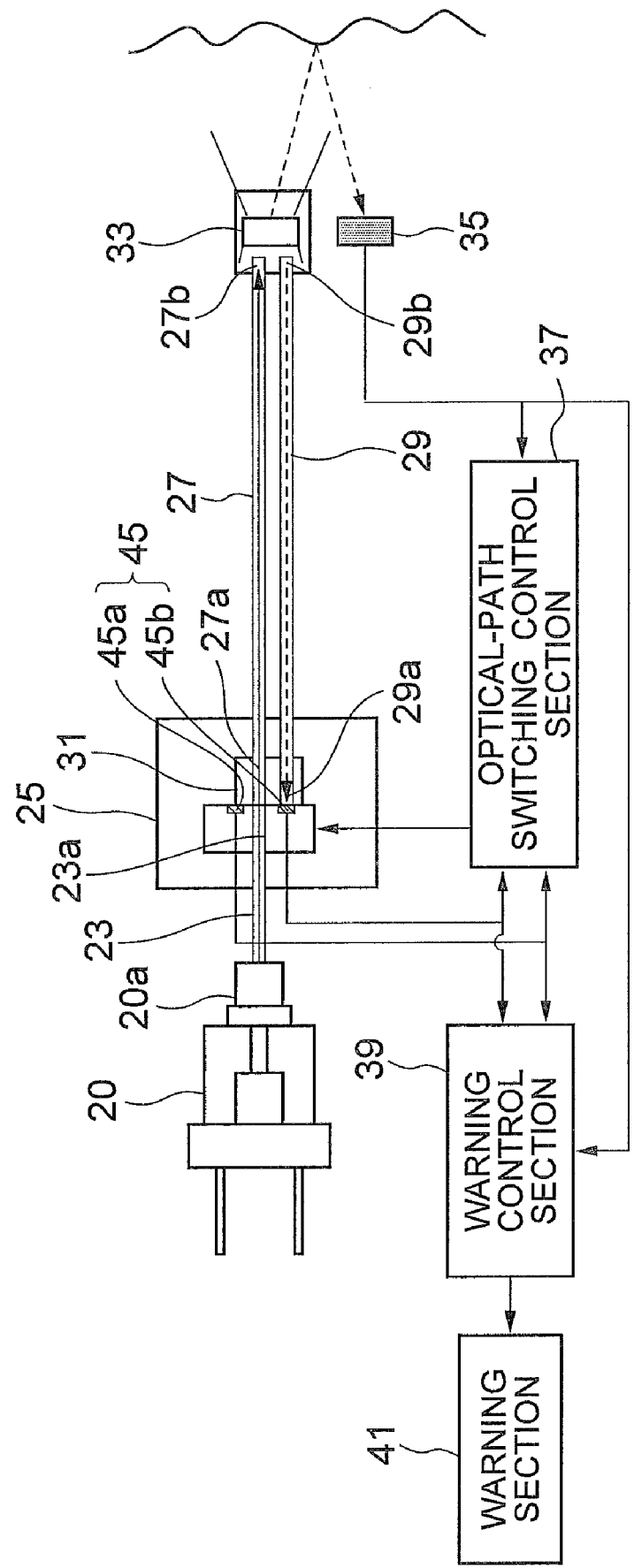
FIG. 2 is a diagram showing a schematic structure of the light source apparatus according to the first embodiment of the present invention.
Figure 3:
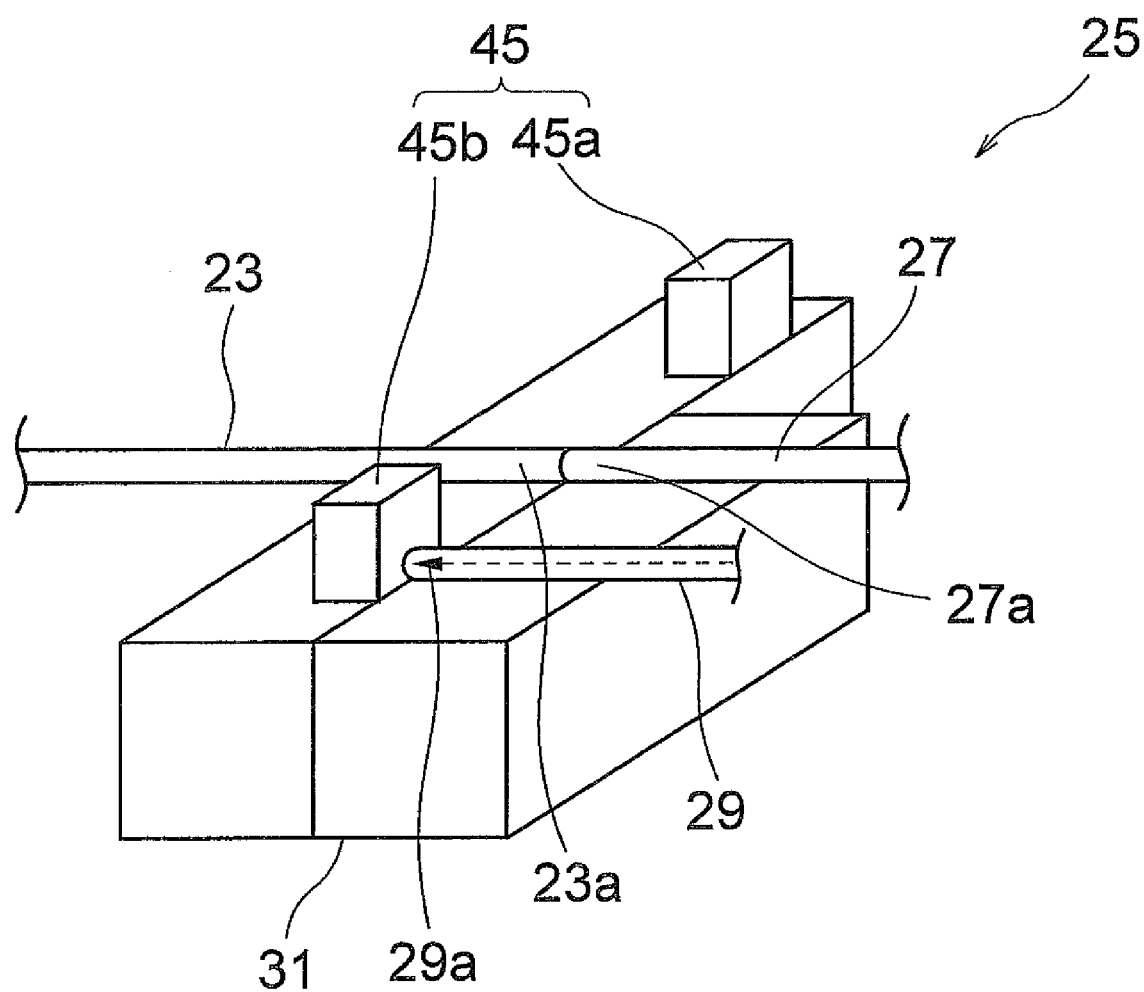
FIG. 3 is a diagram showing an enlarged perspective view of an optical-path switching section in FIG. 2.

FIG. 1 is a block diagram of a light source apparatus according to a first embodiment of the present invention. FIG. 2 is a diagram showing a schematic structure of the light source apparatus according to the first embodiment of the present invention. FIG. 3 is a diagram showing an enlarged perspective view of an optical-path switching section 25 in FIG. 2.

An excitation-light guiding member 23 which guides excitation light from an excitation-light source 20 is connected to the excitation-light source 20 which generates the excitation light. A semiconductor laser light source is used for the excitation-light source 20, and the excitation-light source 20 is connected to a driving circuit which is not shown in the diagram, and emits laser light which is excitation light. Moreover, an optical fiber is used for the excitation-light guiding member 23 in order to guide efficiently the excitation light emitted from the excitation-light source 20.

The optical fiber includes a core and a clad which is on an outer side of the core, and a refractive index of the core is higher than a refractive index of the clad. Therefore, the structure is such that light is subjected to total internal reflection, and is transmitted efficiently through a portion of the core. The core and the clad are made of glass or a plastic resin.

(Optical-Path Switching Section, First Light Guiding Member, and Second Light Guiding Member)

The optical-path switching section 25 is connected to an excitation-light emergence end 23a of the excitation-light guiding member 23, and a first light guiding member 27 and a second light guiding member 29 which is spare and is to be used when the first light guiding member 27 is degraded or disconnected are connected to the excitation-light emergence end 23a of the optical-path switching section 25.

The optical-path switching section 25, for instance, is an optical-path switching structure as shown in FIG. 3, and the first light guiding member 27 and the second light guiding member 29 are connected to a movable portion 31, and the excitation-light guiding member 23 is disposed on an immovable side of the optical-path switching section 25. In FIG. 3, the excitation-light emergence end 23a of the excitation-light guiding member 23 and an excitation-light incidence end 27a of the first light guiding member 27 are connected, and when the optical-path switching section 25 is switched, the movable portion 31 moves such that the excitation-light emergence end 23a of the excitation-light guiding member 23 and an excitation-light incidence end 29a of the second light guiding member 29 are connected. An optical fiber is used for the first light guiding member 27 and the second light guiding member 29, similarly as for the abovementioned excitation-light guiding member 23.

(Wavelength Converting Member)

A wavelength converting member 23 is connected to an excitation-light emergence end 27b of the first light guiding member 27 and an excitation-light emergence end 29b of the second light guiding member 29. The wavelength converting member 33 is a fluorescent substance for example, and is a member which, upon receiving the excitation light, irradiates a wavelength-converted light of a wavelength different from a wavelength of the excitation light, and illuminates an object to be illuminated. The fluorescent substance in this case, may be a monocrystalline fluorescent substance, a polycrystalline fluorescent substance which is made transparent, or may be a normal powder phosphor or a fluorescent substance in which, a so-called nano fluorescent substance is mixed in a member such as resin. Furthermore, any material can be used as a fluorescent substance provided that it is a fluorescent substance which is commonly used, such as a light-emitting glass in which, a rare earth element which basically emits light is added to glass etc.

(First Light Receiving Element)

A first light receiving element 35 is installed near the wavelength converting member 33. The first light receiving element 35 is an element such as an imaging device or a photodiode which receives wavelength-converted light which has been reflected from the object to be illuminated, and allows to observe the object to be illuminated. The first light receiving element 35 converts the wavelength-converted light which has been received, to an electric signal, and outputs the electric signal to a warning control section 39 and an optical-path switching control section 37.

(Second Light Receiving Element)

A second light receiving element 45 is installed on the optical-path switching section 25. The second light receiving element 45 (45a and 45b) is installed on the movable portion 31 of the optical-path switching section 25 as shown in FIG. 3, and is disposed to be facing the excitation-light incidence end 27a or the excitation-light incidence end 29a of one of the first light guiding member 27 and the second light guiding member 29 which is not guiding the excitation light, according to switching of an optical path. The second light receiving element 45 is an element such as an imaging device or a photodiode, which receives the wavelength-converted light guided by the first light guiding member 27 or the second light guiding member 29, which has been emerged from the wavelength-converting member 33.

The second light receiving element 45 is electrically connected to the optical path switching control section 37 and the warning control section 39.

(Warning Control Section)

The warning control section 39 is connected to a warning section 41, and is a control circuit which judges a defect of the first light guiding member 27 and the second light guiding member 29 according to an intensity of light received by the first light receiving element 35 and the second light receiving element 45, and controls a drive of the warning section 41.

(Warning Section)

The warning section 41 which is operated upon receiving a signal from the warning control section 39 is a device which informs that at least one of the first light guiding member 27 and the second light guiding member 29 is degraded or disconnected, such as a monitor which informs a user of an illuminating device by characters and diagrams, a warning lamp which informs by emitting light, and a warning device which informs by audio or buzzer.

(Optical-Path Switching Control Section)

The optical-path switching control section 37 is a control circuit which is connected to the optical-path switching section 25, and which judges a defect of the first light guiding member 27 and the second light guiding member 29 according to the intensity of light received by the first light receiving element 35 and the second light receiving element 45, and operates the optical-path switching section 25.

(Normal Operation)

To start with, an operation when the excitation-light guiding member 23 is connected to the first light guiding member 27 will be described below. First of all, the excitation-light source 20 emits laser light which is the excitation light. The excitation light is guided to the optical-path switching section 25 which is connected to the excitation-light emergence end 23a of the excitation-light guiding member 23, by the excitation-light guiding member 23 which is connected to the excitation-light emergence end 20a of the excitation-light source 20. In the optical-path switching section 25, the excitation-light emergence end 23a being connected to the excitation-light incidence end 27a of the first light guiding member 27, the excitation light is guided to the first light guiding member 27. Excitation light from the first light guiding member 27 is guided to the wavelength converting member 33 which is connected to the excitation-light emergence end 27b of the first light guiding member 27. The wavelength converting member 33 receives the excitation light and emits wavelength-converted light of a wavelength different from a wavelength of the excitation light. By the wavelength-converted light illuminating the object to be illuminated, it is possible to pickup an image by an imaging device in a dark environment for example.

The wavelength-converted light which has illuminated the object to be illuminated is reflected by the object and received by the first light receiving element 35. The first light receiving element 35 converts the wavelength-converted light to an electric signal, and outputs the electric signal to the warning control section 39 and the optical-path switching control section 37.

Moreover, the wavelength-converted light emitted by the wavelength converting member 33, by being emerged also in a direction of the first light guiding member 27 and the second light guiding member 29 disposed on an opposite side of the object to be illuminated, a part of the wavelength-emitted light is incident on the second light guiding member 29. The wavelength-converted light is guided to the second light receiving element 45b by the second light guiding member 29. The second light receiving element 45b receives the wavelength-converted light and upon converting to an electric signal, outputs the electric signal to the warning control section 39 and the optical-path switching control section 37.

When an intensity of light received by the second light receiving element 45b is not less than a predetermined value, the warning control section 39 judges the first light guiding member 27 and the second light guiding member 29 to be normal. Here, the predetermined value is an intensity of light received by the light receiving element when the excitation light is being guided normally, and is to be set in advance by measuring etc.

(Operation when First Light Guiding Member is Disconnected)

When the first light guiding member 27 is disconnected, the excitation light which the excitation-light source 20 has emitted is not guided up to the wavelength converting member 33. Accordingly, the wavelength-converted light is also not emerged from the wavelength converting member 33, and the first light receiving element 35 and the second light receiving element 45 are in a state of not receiving the wavelength-converted light. The intensity of light received by the first light receiving element 35 and the second light receiving element 45 is output as an electric signal to the warning control section 39 and the optical-path switching control section 37.

When the intensity of light received by the first light receiving element 35 is less than a predetermined value, and when the intensity of light received by the second light receiving element is less than a predetermined value, the warning control section 39 judges the first light guiding member 27 to be defective, and controls such that the warning section 41 gives a warning. The warning section 41 gives a warning informing a user of the light source apparatus 1 that the first light guiding member 27 has a defect.

When the intensity of light received by the first light receiving element 35 becomes less than a predetermined value and the intensity of light received by the second light receiving element 45 becomes less than a predetermined value, the optical-path switching control section 37 judges the first light guiding member 27 to be defective, and makes the optical-path switching section 25 operate. The excitation-light guiding member 23 is connected to the second light guiding member 29, and the excitation light emitted by the excitation-light source 20 can be guided to the wavelength converting member 33.

(Operation when Second Light Guiding Member is Disconnected)

When the second light guiding member 29 is disconnected, the excitation light emitted by the excitation-light source 20 is guided by the first light guiding member 27 up to the wavelength converting member 33. However, since the second light guiding member 29 is disconnected, the wavelength-converted light is not guided up to the second light receiving element 45b. Therefore, the second light receiving element 45b is in a state of not receiving the wavelength-converted light. The intensity of light received by the first light receiving element 35 and the second light receiving element 45 is output as an electric signal to the warning control section 39 and the optical-path switching control section 37.

When the intensity of light received by the first light receiving element 35 is not less than a predetermined value, and when the intensity of light intensity received by the second light receiving element 45 is less than a predetermined value, the warning control section 39 judges the first light guiding member 27 to be normal and the second light guiding member 29 to be defective, and controls such that the warning section 41 gives a warning. The warning section 41 gives a warning informing the user that the second light guiding member 29 has a defect.

When the intensity of light received by the first light receiving element 35 becomes not less than a predetermined value, and when the intensity of light received by the second light receiving element 45 becomes less than a predetermined value, the optical-path switching control section 37 judges the first light guiding member 27 to be normal and the second light guiding member 29 to be defective, and does not make the optical-path switching section 25 operate. The excitation-light guiding member 23 is connected to the normal first light guiding member 27 as it has been, and can illuminate continuously. An intensity of the wavelength-converted light which is illumination light can be estimated by the intensity of light received by the first light receiving element 35.

(Advantage)

Even when the first light guiding member 27 is degraded or disconnected as described above, and cannot be used, by using upon switching to the second light guiding member 29, the excitation light can be guided, and the object to be illuminated can be continued to be illuminated without discontinuing the use of the light source apparatus 1, and without repairing or replacing.

Moreover, when it is checked in advance before using that the first light guiding member 27 and the second light guiding member 29 are not disconnected, as a possibility of both the first light guiding member 27 and the second light guiding member 29 being disconnected simultaneously is low, even when one of the first light guiding member 27 and the second light guiding member 29 is disconnected, it is possible to continue the use of the light source apparatus 1.

Although two second light receiving elements 45a and 45b are provided in the first embodiment, the object of the present invention can be achieved by providing at least one second light receiving element. For example, when the excitation-light guiding member 23 is connected to the first light guiding member 27, suitability of the first light guiding member 27 can be checked by the first light receiving element 35 and the second light receiving element 45b.

Moreover, when the first light guiding member 27 has a defect, the excitation-light guiding member 23 is connected to the second light guiding member 29 by the optical-path switching section 25, and the light source apparatus 1 is to be used, and after switching, for checking the suitability of the second light guiding member 29, the first light guiding member 27 which is judged to have a defect, and the second light receiving element 45a are not to be used.

The second light receiving element 45a is effective in checking whether or not the first light guiding member 27 and the second light guiding member 29 have a defect, before using the light source apparatus 1. In other words, before using the light source apparatus 1, the excitation-light guiding member 23 and the first light guiding member 27 are connected, and the checking is carried out by using the second light receiving element 45b etc., and next, the excitation-light guiding ember 23 and the second light guiding member 29 are connected, and the checking is carried out by using the second light receiving element 45a etc. In this case, it is preferable to provide the second light receiving elements 45a and 45b.

First Modified Embodiment of First Embodiment

Figure 4:
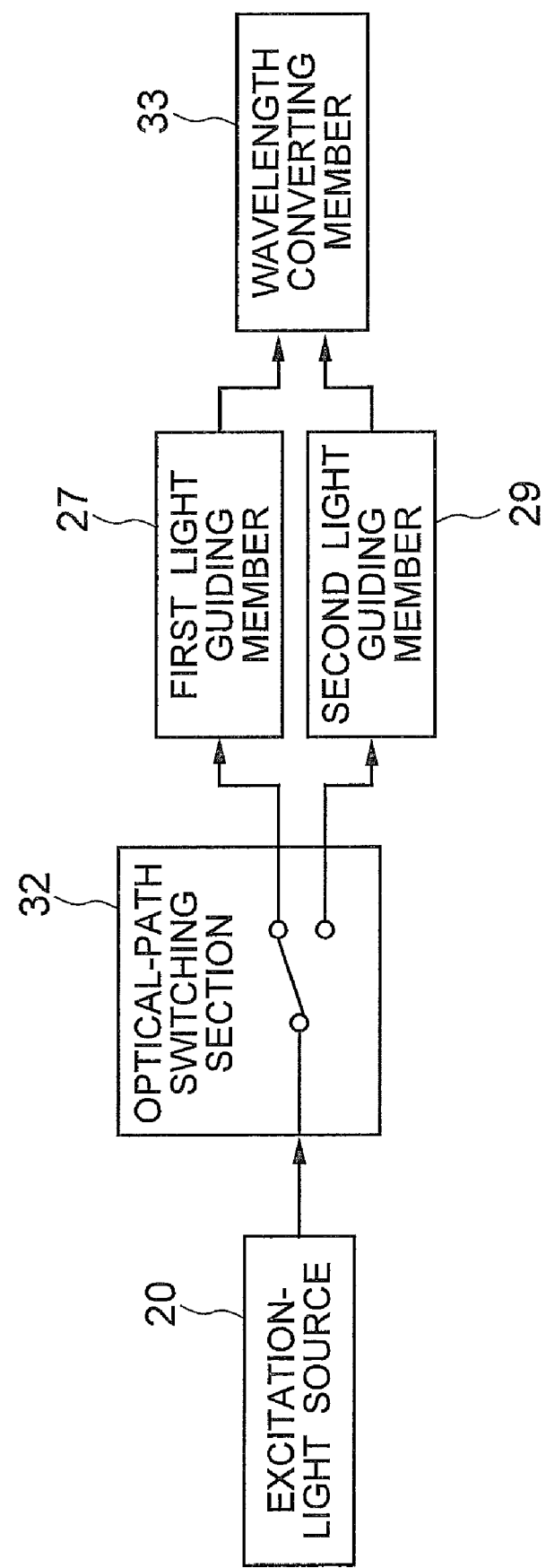
FIG. 4 is a block diagram showing principal sections of a light source apparatus according to a first modified embodiment of the first embodiment of the present invention.
Figure 5:
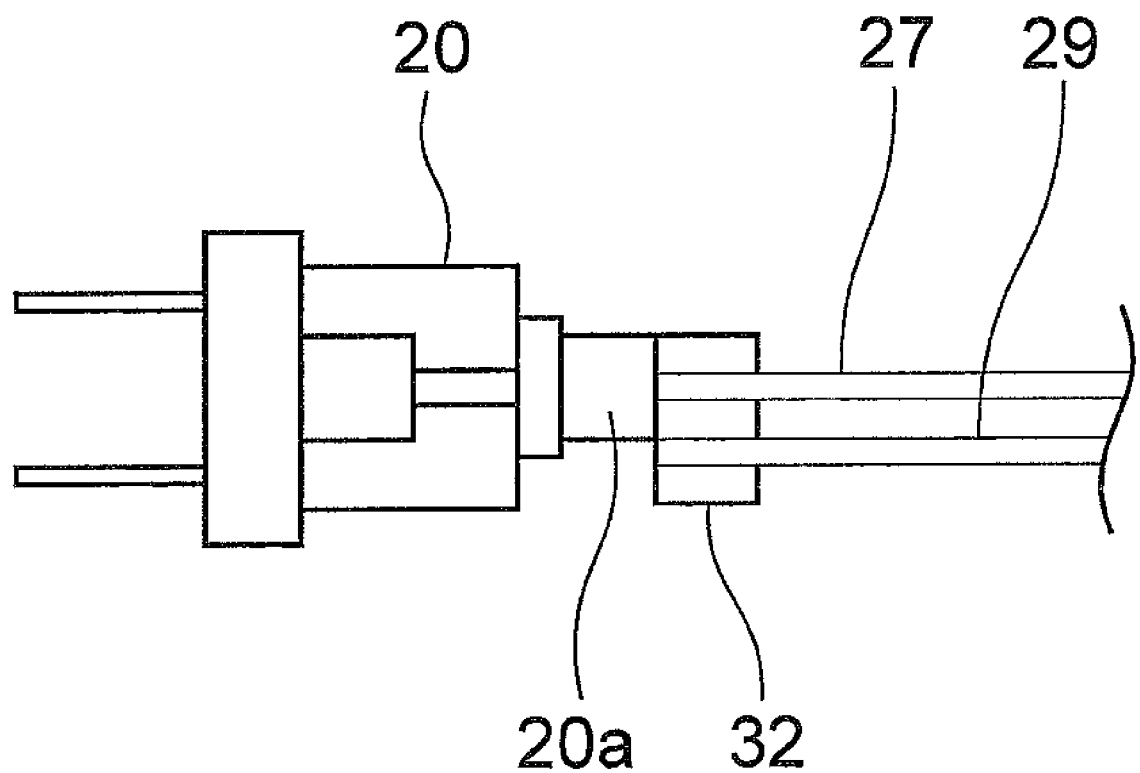
FIG. 5 is diagram showing a schematic structure of the light source apparatus according to the first modified embodiment of the first embodiment of the present invention.

Structure in which Optical-Path Switching Section is Provided Immediately after Excitation-Light Source A light source apparatus according to a first modified embodiment of the first embodiment will be described below. FIG. 4 is a block diagram showing principal sections of the light source apparatus according to the first modified embodiment of the first embodiment of the present invention. FIG. 5 is a diagram showing a schematic structure of the light source apparatus according to the first modified embodiment of the first embodiment of the present invention. In diagrams of the first modified embodiment and the other modified embodiments, only sections which are different from sections in the first embodiment are indicated, and other sections having the same structure as in the first embodiment are omitted.

In the first embodiment in FIG. 1, the optical-path switching section 25 is connected to the excitation-light guiding member 23. However, in the first modified embodiment as shown in FIG. 4 and FIG. 5, a point that an optical-path switching section 32 is coupled with the excitation-light emergence end 20a of the excitation-light source 20, and a connection of the excitation-light emergence end 20a of the excitation light source 20 is switched to one of the first light guiding member 27 and the second light guiding member 29 differs from the first embodiment. Accordingly, the excitation-light guiding member 23 is unnecessary, and since it is possible to omit a connecting portion of the excitation-light guiding member 23 and the excitation-light source 20 or the optical-path switching section 25, it is possible to reduce a connection loss of an intensity of excitation light, and to improve further an efficiency of the excitation light. The second light receiving element (not shown in FIG. 5) is disposed parallel to the excitation-light emergence end 20a of the excitation-light source 20.

Second Modified Embodiment of First Embodiment

Light Shielding Member

Figure 6:
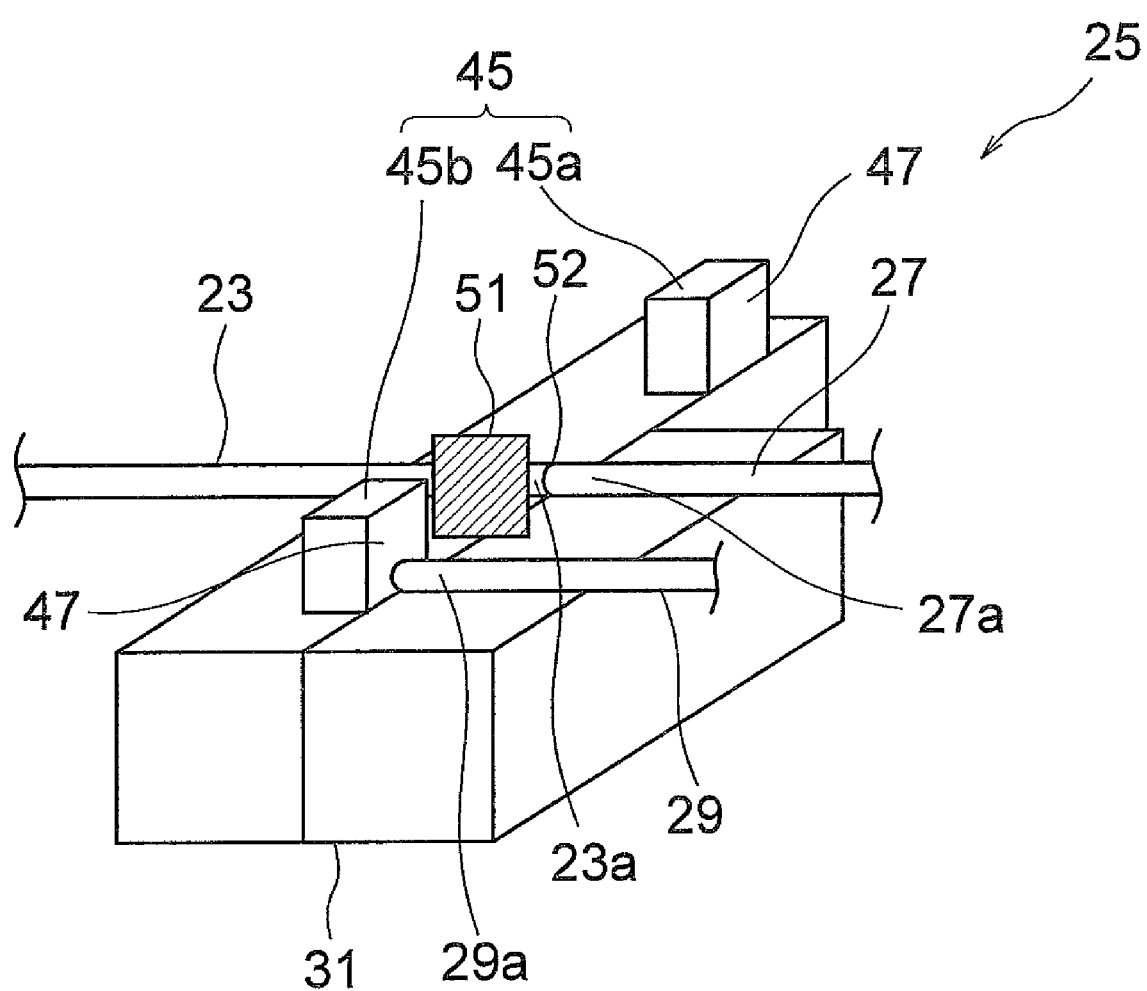
FIG. 6 is a diagram showing a perspective view of a part of a light source apparatus according to a second modified embodiment of the first embodiment of the present invention.

A second modified embodiment of the first embodiment will be described below while referring to FIG. 6. FIG. 6 is a diagram showing a perspective view of a part of a light source apparatus according to the second modified embodiment.

When excitation light which is guided from an optical-path switching connecting portion 52 of the optical-path switching section 25, which connects the excitation-light emergence end 23a of the excitation-light guiding member 23 and the excitation-light incidence end 27a or the excitation-light incidence end 29a of one of the first light guiding member 27 or the second light guiding member 29 which is connected (connecting portion of the excitation-light emergence end 23a and the excitation-light incidence end 27a (29a)) is leaked, there is a possibility that the second light receiving element 45 receives the leaked light, which becomes a noise.

Therefore, as shown in FIG. 6, the second modified embodiment differs from the first embodiment a point that a leaked-light preventing section which does not allow at least a light of a wavelength same as a wavelength of the excitation light, or in other words, alight shielding member 51 which cuts off the excitation light, is placed between the optical-path switching connecting portion 52 and a light receiving surface 47 of the second light receiving element 45. In this case, the light shielding member 51 is fixed at a side of the first light guiding member 27 and the second light guiding member 29, and the movable portion 31 is moved such that the excitation-light guiding member 23 and the light shielding member 51 do not collide. For example, in a case of switching the excitation-light guiding member 23 from a state of being connected to the first light guiding member 27, the movable portion 31 moves such that the excitation-light guiding member 23 and the first light guiding member 27 are separated apart mutually in a direction of an optical path (a direction in which the light guiding member is extended). Next, the movable portion 31 moves in a direction orthogonal to the direction of the optical path such that an optical path (excitation-light emergence end 23a) of the excitation-light guiding member 23 and an optical path (excitation-light incidence end 29a) of the second light guiding member 29 are aligned, and finally, the movable portion 31 moves such that the excitation-light guiding member 23 and the second light guiding member 29 come in contact in the direction of the optical path.

According to the abovementioned arrangement, since it is not necessary to provide a space or another optical member between the first light guiding member 27 and the second light receiving element 45a, and between the second light guiding member 29 and the second light receiving element 45b, it is possible to cut off the excitation light which becomes noise, without reducing an intensity of the wavelength-converted light received by the second light receiving element 45.

Third Modified Embodiment of First Embodiment

Filter

Figure 7:
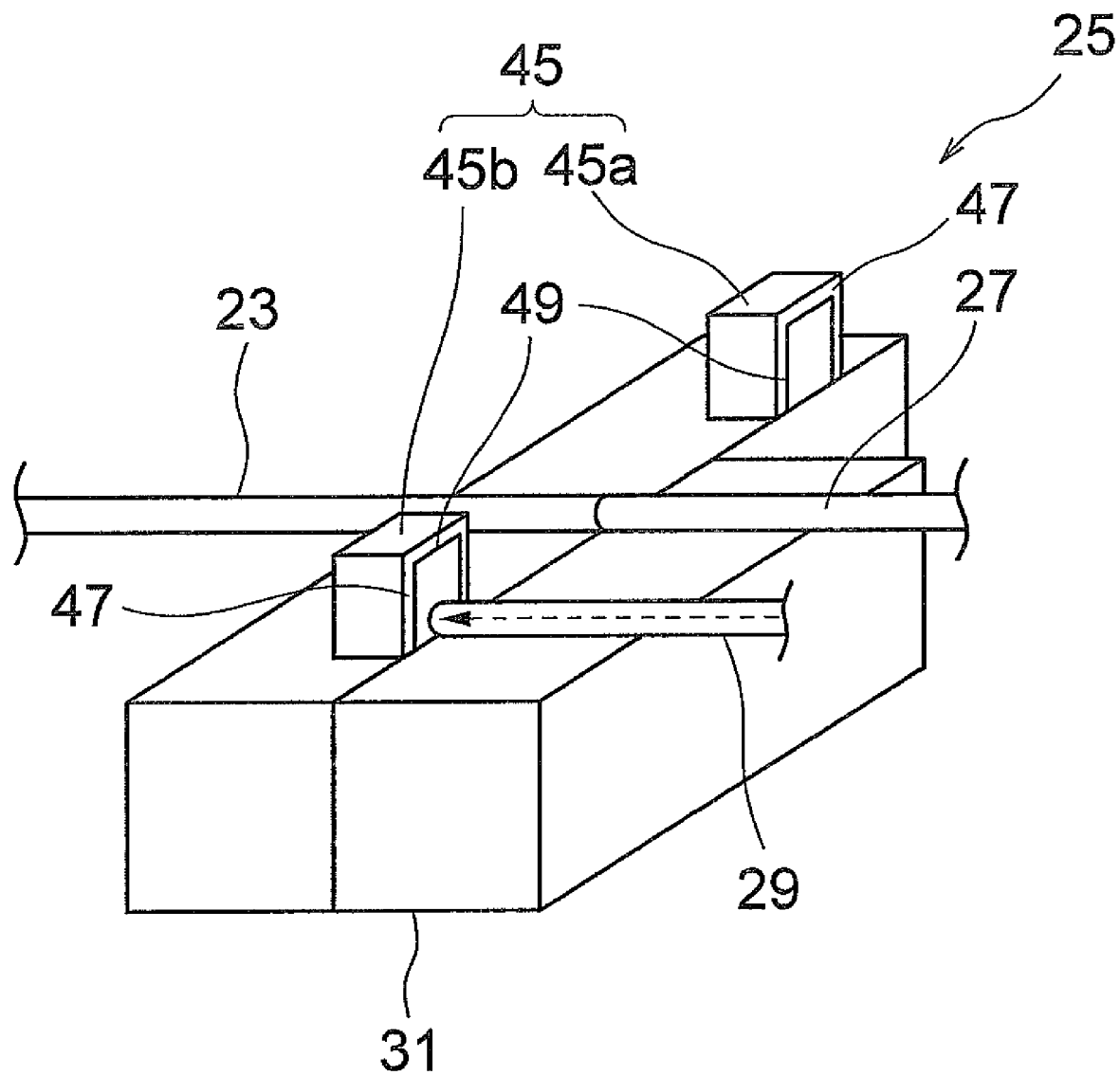
FIG. 7 is a diagram showing a perspective view of a part of a light source apparatus according to a third modified embodiment of the first embodiment of the present invention.

A third modified embodiment of the first embodiment will be described below while referring to FIG. 7. FIG. 7 is a diagram showing a perspective view of a part of a light source apparatus according to the third modified embodiment. As shown in FIG. 7, the third modified embodiment differs from the first embodiment at a point that a leaked-light preventing section, or in other words, an optical filter through which, light of a wavelength same as the wavelength of the wavelength-converted light passes, and light of a wavelength same as the wavelength of the excitation light does not pass, is provided to the light receiving surface 47 of the second light receiving element 45. Accordingly, it is possible to reduce a possibility that the excitation light which becomes noise is incident on the second light receiving element 45, without changing a mechanism of the optical-path switching section 25 as in the second modified embodiment.

Fourth Modified Embodiment of First Embodiment

Lens

Figure 8:
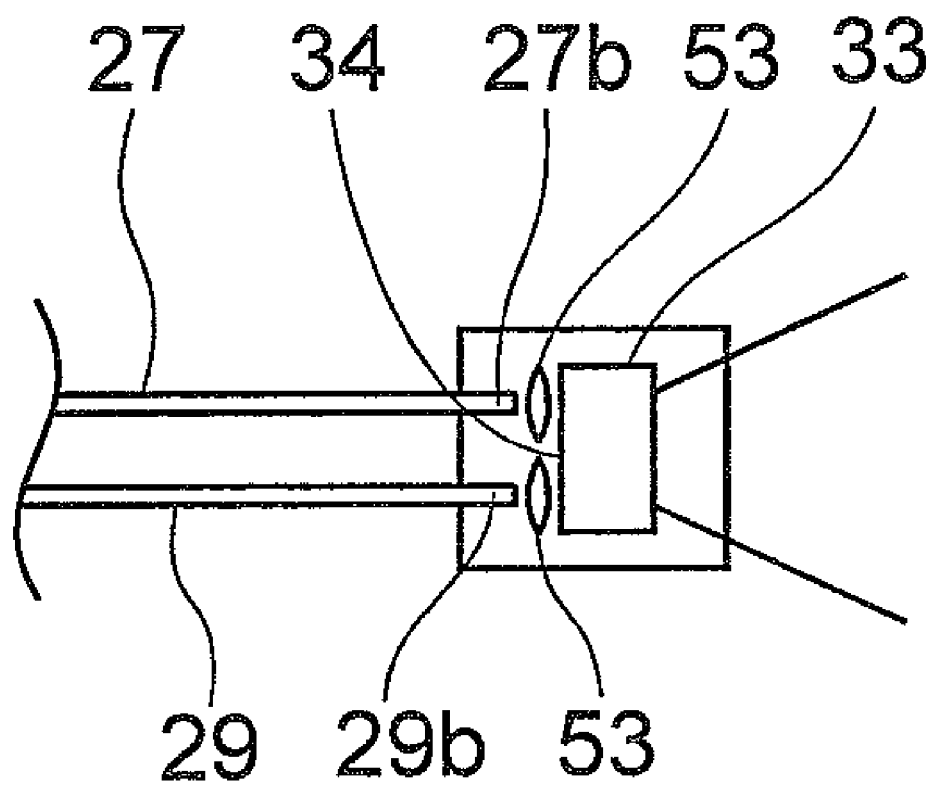
FIG. 8 is a diagram showing a perspective view of a wavelength-converting member according to a fourth modified embodiment of the first embodiment of the present invention.

A fourth modified embodiment of the first embodiment will be described below while referring to FIG. 8. FIG. 8 is a diagram showing a structure of the wavelength-converting member 33 according to the fourth modified embodiment.

As shown in FIG. 8, the fourth modified embodiment differs from the first embodiment a point that, a lens 53 is installed between the excitation-light emergence end 27b of the first light guiding member 27 and the excitation-light emergence end 29b of the second light guiding member 29, and the wavelength converting member 33.

By a light-converging operation of the lens 53, it is possible to irradiate with higher intensity, the excitation light from the first light guiding member 27 (or the second light guiding member 29) to a predetermined area of a surface 33a of the wavelength-converting member 33, and to increase an intensity of the wavelength-converted light which is emitted, and to make incidence with a high coupling efficiency, the wavelength-converted light which is emerged from the wavelength converting member 33 on the second light guiding member 29 (or the first light guiding member 27).

Fifth Modified Embodiment of First Embodiment

Structure in which End Portion of Light Guiding Members are Brought in Contact

Figure 9:
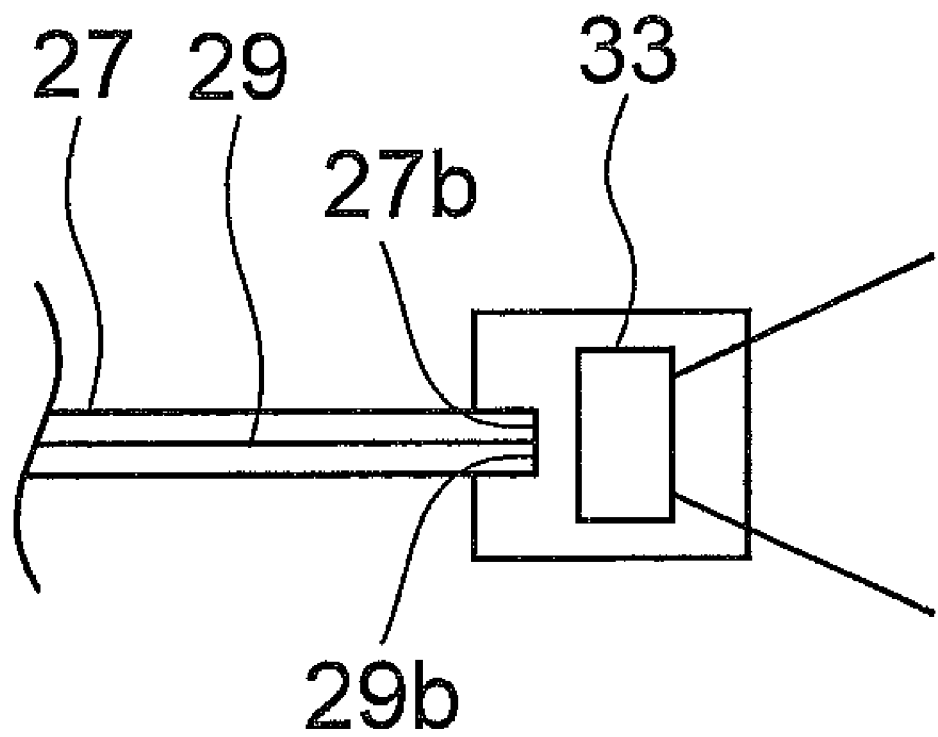
FIG. 9 is a diagram showing a schematic structure of a first light guiding member and a second light guiding member according to a fifth modified embodiment of the first embodiment of the present invention.

A fifth modified embodiment of the first embodiment will be described below while referring to FIG. 9. FIG. 9 is a diagram showing a schematic structure of the first light guiding member 27 and the second light guiding member 29 according to the fifth modified embodiment. As shown in FIG. 9, the fifth modified embodiment differs from the first embodiment at a point that, the excitation-light emergence end 27b of the first light guiding member 27 and the excitation-light emergence end 29b of the second light guiding member 29 are disposed to be in contact near the wavelength converting member 37.

The excitation light guided by the first light guiding member 27 is irradiated to the wavelength converting member 33, and the wavelength converting member 33 emits the wavelength-converted light from a location to which the excitation light has been irradiated. By installing the second light guiding member 29 adjacent to the first light guiding member 27 (a side surface of the first light guiding member 27 and a side surface of the second light guiding member 29 are in contact), it is possible to make incident a part of the wavelength-converted light efficiently on the second light guiding member 29 without increasing the members. In other words, an intensity of the excitation light emerged from the excitation-light emergence end 27a of the first light guiding member 27 is the strongest in a direction along an optical axis. Consequently, an intensity of the wavelength-converted light which is emerged from the wavelength converting member 33 is also the strongest at a portion of intersection with an optical axis of the excitation light. By disposing the excitation-light emergence end 27b of the first light guiding member 27 adjacent to the excitation-light emergence end 29b of the second light guiding member 29, since the excitation-light emergence end 29b of the second light guiding member 29 is disposed near a portion of the wavelength converting member 33 emitting the light most brightly, it is possible to make a part of the wavelength-converted light incident efficiently on the second light guiding member 29. As a result, as to whether or not the first light guiding member 27 and the second light guiding member 29 have a defect can be detected accurately.

Sixth Modified Embodiment of First Embodiment

Figure 10:
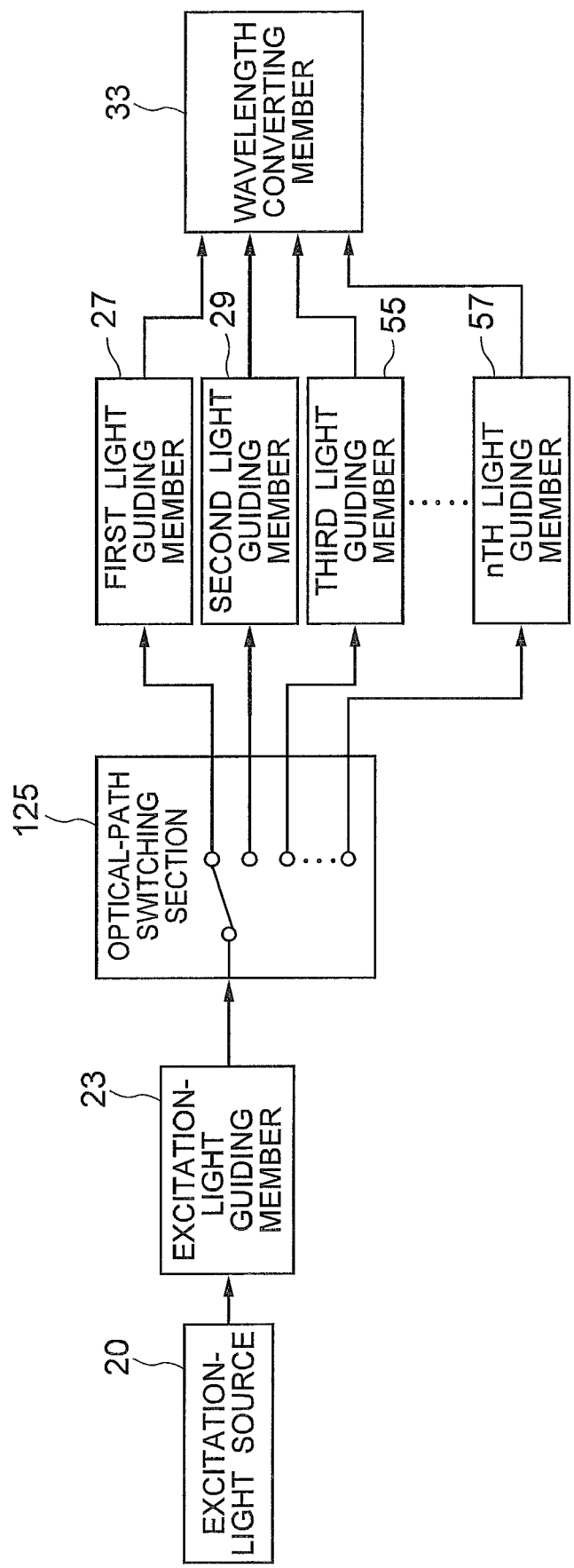
FIG. 10 is a block diagram showing principal sections of a light source apparatus according to a sixth modified embodiment of the first embodiment of the present invention.

Light Guiding Members from Third Light Guiding Member to Nth Light Guiding Member A sixth modified embodiment of the first embodiment will be described below while referring to FIG. 10. FIG. 10 is a block diagram showing principal sections of a light source apparatus according to the sixth modified embodiment of the first embodiment of the present invention.

In the first embodiment of FIG. 1 and FIG. 2, one second light guiding member 29 has been provided as a spare light guiding member. As shown in FIG. 10, the sixth modified embodiment differs from the first embodiment at a point that it has (n−2) more numbers (where, n is an integer not less than 3) of spare light guiding members having a similar function as the second light guiding member 29. In this structure, connection of the excitation-light guiding member with one of the first light guiding member 27, the second light guiding member 29, a third light guiding member 55, . . . , nth light guiding number 57 is to be switched by an optical-path switching section 125. Larger the number of the spare light guiding members, lower is a possibility that all are disconnected at the same time. Therefore, a possibility that, the light source apparatus can be used continuously is more.

Seventh Modified Embodiment of First Embodiment

Optical Fiber Made of Plastic

Figure 11:
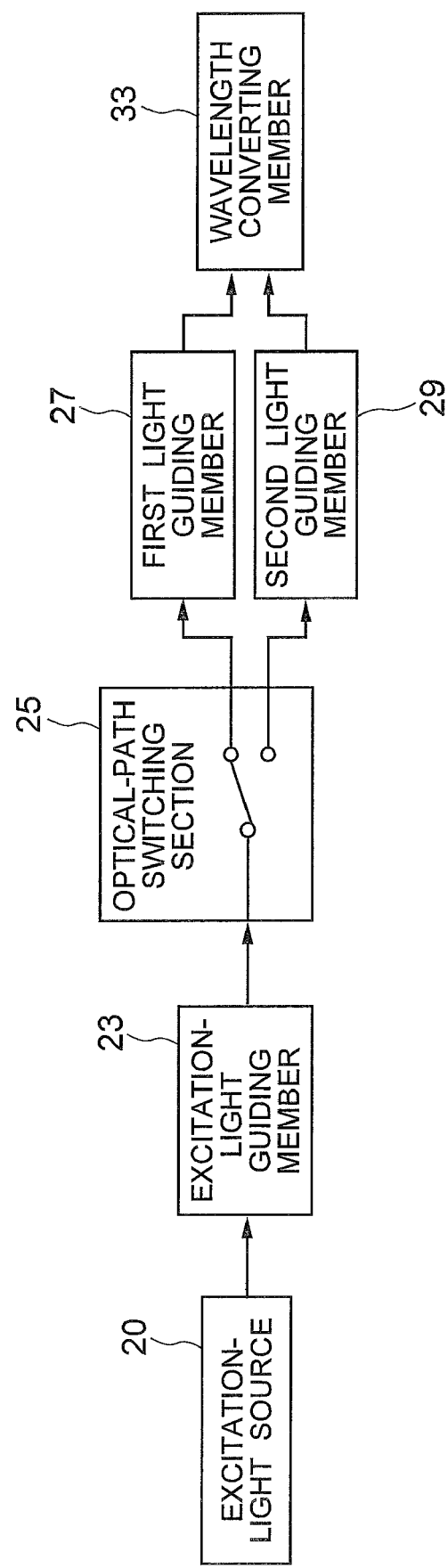
FIG. 11 is a block diagram showing principal sections of a light source apparatus according to a seventh modified embodiment of the first embodiment of the present invention.

A seventh modified embodiment of the first embodiment will be described below while referring to FIG. 11. FIG. 11 is a block diagram showing principal sections of a light source apparatus according to the seventh modified embodiment of the first embodiment.

As shown in FIG. 11, the seventh modified embodiment differs from the first embodiment at a point that, an optical fiber made of glass for which, a transmission loss is less is used for the first light guiding member 27 which is used normally, and an optical fiber made of plastic which is durable material for bending is used for the second light guiding member 29 which is used as a spare. Accordingly, it is possible to lower further a possibility that the second light guiding member 29 which is a spare guiding member is disconnected.

Eighth Modified Embodiment of First Embodiment

First Light Receiving Element

Although it is not shown in the diagram, the eighth modified embodiment differs from the first embodiment at a point that, in FIG. 2, the structure is let to be such that the first light receiving element 35 receives directly the wavelength-converted light which has been emitted by the wavelength-converting member 33. By letting it not to be reflected light but to be light received directly, it is possible to receive the wavelength-converted light efficiently. As a result, it is possible to detect accurately whether or not the light guiding member has a defect.

In the first embodiment and the modified embodiments thereof described above, the light guiding members are switched automatically by the optical-path switching section (25, 32, and 125). However, even for a structure without an automatic optical-path switching section, by observing directly the wavelength-converted light emitted by the wavelength converting member 33, or by observing an image picked up by an imaging device, as to whether the first light guiding member 27, the second light guiding member 29, or the spare light guiding members 55 and 57 is disconnected may be checked, and when it is disconnected, the switching may be carried out manually. Accordingly, it is possible to reduce the members and to make the structure simple.

Second Embodiment

Figure 12:
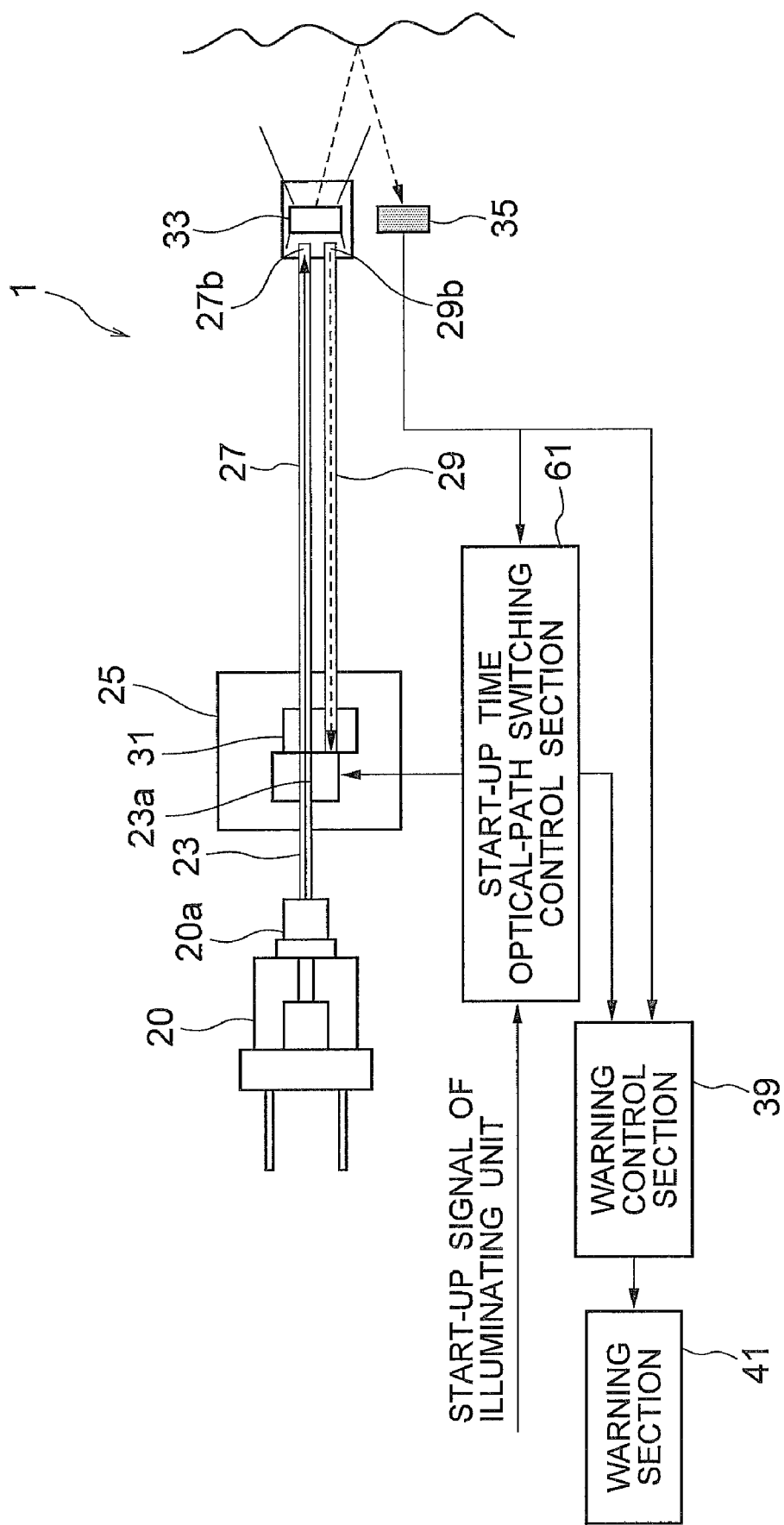
FIG. 12 is a diagram showing a schematic structure of a light source apparatus according to a second embodiment of the present invention.
Figure 13:
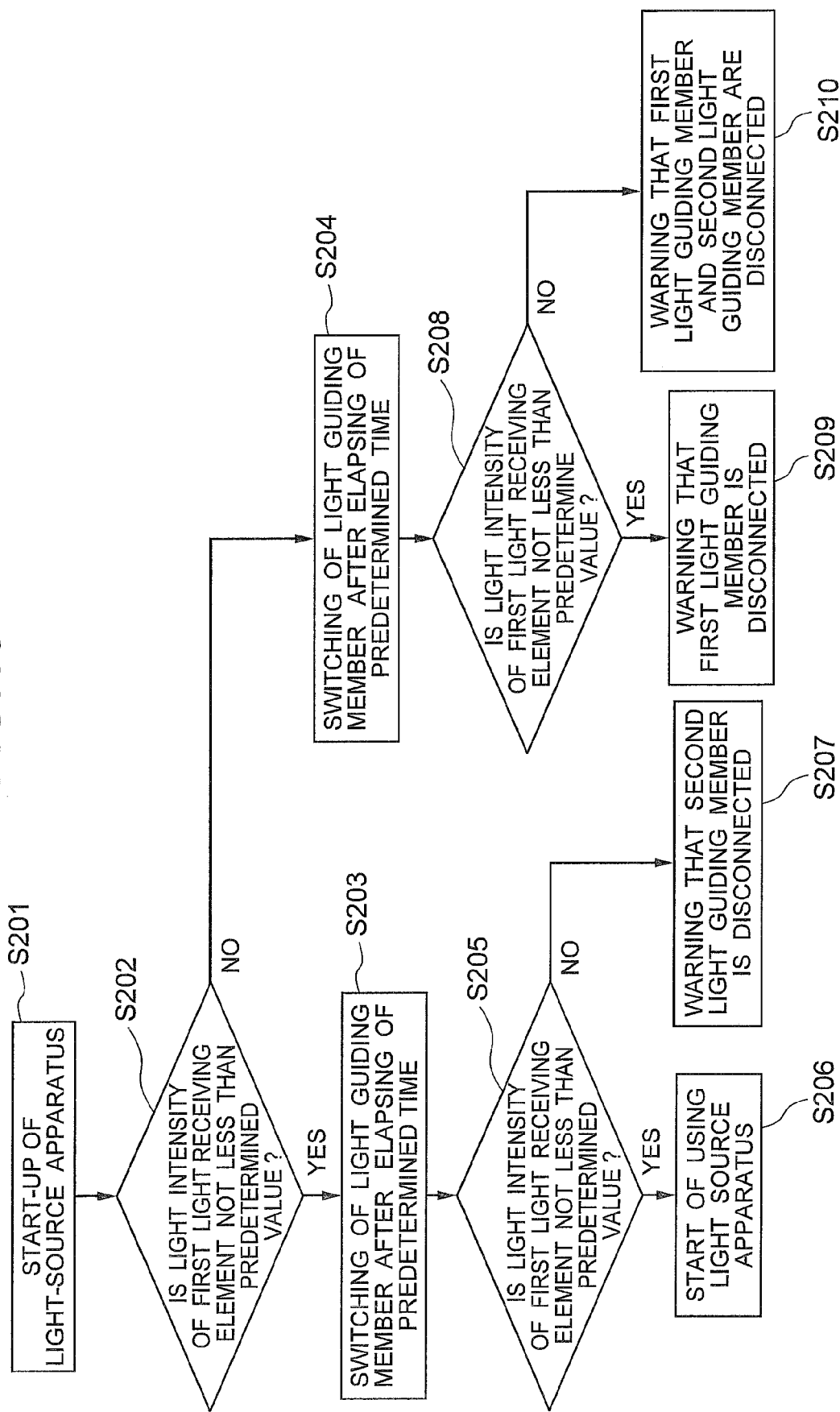
FIG. 13 is diagram showing an operation flow from a start-up up to start of use of the light source apparatus according to the second embodiment of the present invention.

A light source apparatus according to a second embodiment of the present invention will be described below while referring to FIG. 12 and FIG. 13. FIG. 12 is a diagram showing a schematic structure of the light source apparatus 1 according to the second embodiment of the present invention. FIG. 13 is a diagram showing an operation flow from a start-up up to a start of use of the light source apparatus 1 according to the second embodiment of the present invention.

In the second embodiment of the present invention, a point that there is no second light receiving element of the first embodiment, and start-up time optical-path switching control section in which a function of the optical-path switching control section is changed is provided, differs from the first embodiment. However, a structure may be such that the start-up time optical-path switching control section is added to the structure of the first embodiment.

(Start-Up Time Optical-Path Switching Control Section)

A start-up time optical-path switching control section 61 receives a start-up signal of the light source apparatus, and when a predetermined time is elapsed after the start-up of the light source apparatus, the start-up time optical-path switching control section 61 carries out a control such that the optical-path switching control section 25 is operated. Moreover, the start-up time optical-path switching control section 61 outputs connection information which indicates a light guiding member out of the first light guiding member 27 and the second light guiding member 29, which is connected to the excitation-light guiding member 23, to the warning control section 39.

Structure of the excitation-light source 20, the excitation-light guiding member 23, the optical-path switching section 25 excluding the second light receiving element, the first light guiding member 27, the second light guiding member 29, the wavelength converting member 33, and the movable portion 31 is same as in the first embodiment.

(First Light Receiving Element)

The first light receiving element 35 receives the wavelength-converted light which has illuminated the object to be illuminated, and converts to an electric signal. Thereafter, the first light receiving element 35 outputs the electric signal to the warning control section 39 and the start-up time optical-path switching control section 61.

(Warning Control Section)

The warning control section 39 is connected to the first light receiving element 35, and judges a defect in a light guiding member which guides the excitation light, according to an intensity of light received by the first light receiving element 35. Further, the warning control section 39, based on the connection information from the start-up time optical-path switching control section 61, specifies as to which one of the first light guiding member and the second light guiding member, has a defect. In other words, the warning control section 39 is a control circuit which controls a drive of the warning section 41 upon associating information of as to which light guiding member has a defect and information which specifies the light guiding member which is judged to have a defect.

(Warning Section)

The warning section 41 is a mechanism which is operated upon receiving a control signal from the warning control section 39, and is a device which informs that at least one of the first light guiding member 27 and the second light guiding member 29 is degraded or disconnected, such as a monitor which informs the user of the light source apparatus 1 by characters and diagrams, a warning lamp which informs by emitting light, and a warning device which informs by audio or buzzer.

(Operation)

An operation after the start-up up to start of use of the light source apparatus 1 when the start-up time optical-path switching control section 61 is connected to the first light guiding member 27, at the time of start-up of the light source apparatus 1 will be described below while referring to FIG. 13. When the light source apparatus 1 is started up (step S201), the start-up time optical-path switching control section 61 outputs to the warning control section 39, connection information which indicates that the first light guiding member 27 is connected to the excitation-light guiding member 23.

Next, the excitation-light source 20 emits laser which is excitation light. The excitation light is guided by the excitation-light guiding member 23 which is connected to the excitation-light emergence end 20a of the excitation-light source 20, to the optical-path switching section 25 which is connected to the excitation-light emergence end 23a of the excitation-light guiding member 23. Being connected to the first light guiding member 27 in the optical-path switching section 25, the excitation light is guided to the first light guiding member 27. The excitation light from the first light guiding member 27 is guided to the wavelength converting member 33 which is connected to the excitation-light emergence end 27b of the first light guiding member 27. The wavelength converting member 33 receives the excitation light and emits the wavelength-converted light of which, wavelength differs from the wavelength of the excitation light. The wavelength-converted light which is emitted illuminates the object to be illuminated (a standard sample having a constant reflectivity as it is a start-up time, such as a reflecting metal plate having a surface coated by a protective film, is used).

The wavelength converted light which has illuminated the object to be illuminated is reflected and received by the first light receiving element 35. The first light receiving element 35 converts the wavelength-converted light received, to an electric signal, and outputs the electric signal to the warning control section 39.

Since the warning control section 39 has received from the start-up time optical-path switching control section 61, the connection information which indicates that the first light guiding member 27 is connected to the excitation-light guiding member 23, when the intensity of light received by the first light receiving element 35 is not less than a predetermined value (step S202), the first light guiding member 27 is judged to be normal.

Whereas, when the first light guiding member 27 is disconnected, the excitation light emitted by the excitation-light source 20 is not guided up to the wavelength converting member 33. Accordingly, the wavelength-converted light is also not emitted from the wavelength converting member 33, and the first light receiving element 35 is in a state of not receiving the wavelength-converted light. Consequently, the intensity of light received by the first light receiving element 35 is less than the predetermine value, and the warning control section 39 judges the first light guiding member 27 which is guiding the excitation light, to have a defect (step S202). In this manner, during a predetermined time after the light source apparatus 1 is started up, a judgment of whether or not the first light guiding member 27 has a defect is made.

The start-up time optical-path switching control section 61 makes the optical-path switching section 25 be operated after a predetermined time has elapsed upon receiving a signal to start-up the light source apparatus 1 (steps S203 and S204), and switches to the second light guiding member 29. Moreover, the start-up time optical-path switching control section 61 outputs to the warning control section 39, connection information which indicates that the second light guiding member 29 is connected.

Similarly as when the first light guiding member 27 is connected to the excitation-light guiding member 23, the warning control section 39 makes a judgment of whether the second light guiding member is normal or defective.

When the intensity of light received by the first light receiving element 35 is not less than the predetermined value, the second light guiding member 29 is judged to be normal by the warning control section 39. When it has been judged that the first light guiding member 27 is normal at step S202, since none of the first light guiding member 27 and the second light guiding member 29 is defective, the warning by the warning section 41 is not given, and start of use of the light source apparatus 1 becomes possible (step S206). When it has been judged that the first light guiding member 27 has a defect at step S202, the warning control section 39 controls the warning section 41 to give a warning that only the first light guiding member 27 has a defect (step S209).

Conversely, for the second light guiding member 29, when the intensity of light received by the first light receiving element 35 is less than the predetermined value (steps S205 and S208), a second light guiding member 29 is judged to be defective. When the first light guiding member 27 has already been judged to be normal at step S202, the warning control section 39 controls the warning section 41 to give a warning that only the second light guiding member 29 has a defect (step S207). Moreover, when the first light guiding member 27 has been judged to be defective at step S202, both the first light guiding member 27 and the second light guiding member 29 are judged to be defective, and the warning control section 39 controls the warning section 41 to give a warning that the first light guiding member 27 and the second light guiding member 29 are defective (step S210). In this manner, the warning section 41 gives a warning which informs the user of the light source apparatus 1, as to which one of the first light guiding member 27 and the second light guiding member 29 has a defect.

(Advantage)

According to the invention described above, before using the light source apparatus 1, it is possible to detect whether the first light guiding member 27 and the second light guiding member 29 are capable of guiding the excitation light normally, or are defective and not capable of guiding the excitation light, and the user can identify a defect by the warning section 41. Accordingly, it is possible to avoid a situation in which, the user starts using the light source apparatus 1 without noticing that one of the first light guiding member 27 and the second light guiding member 29 which is not connected to the excitation-light source 20 has a defect. In other words, the light source apparatus 1 can be used after confirming that there is no defect in the plurality of light guiding members. Moreover, when the first light guiding member 27 is disconnected at the time of use, by detecting the disconnection of the first light guiding member 27 by a change in the intensity of light received by the first light receiving element 35, and by switching promptly by controlling the optical-path switching section 25, to the second light guiding member 29 which has been checked for not being disconnected by the above-mentioned operation flow, it is possible to continue to illuminate the object to be illuminated without discontinuing using the light source apparatus 1, and without repairing or replacing.

In the second embodiment, an arrangement is made such that, a judgment of whether or not the light guiding member has a defect is made after start-up and before using the light source apparatus 1. However, an arrangement may be made such that whether the light guiding member has a defect or not is checked before stopping the light source apparatus 1 after using. Moreover, according to the object to be illuminated (for example, an inner wall of a pipe), whether or not there is a defect may be checked by the abovementioned operation during the use. Furthermore, as in the sixth modified embodiment of the first embodiment, a plurality of spare light guiding members may be provided, and an arrangement may be made such that the light guiding members are checked one after another for any defect.

Modified Embodiment of Second Embodiment

Figure 14:
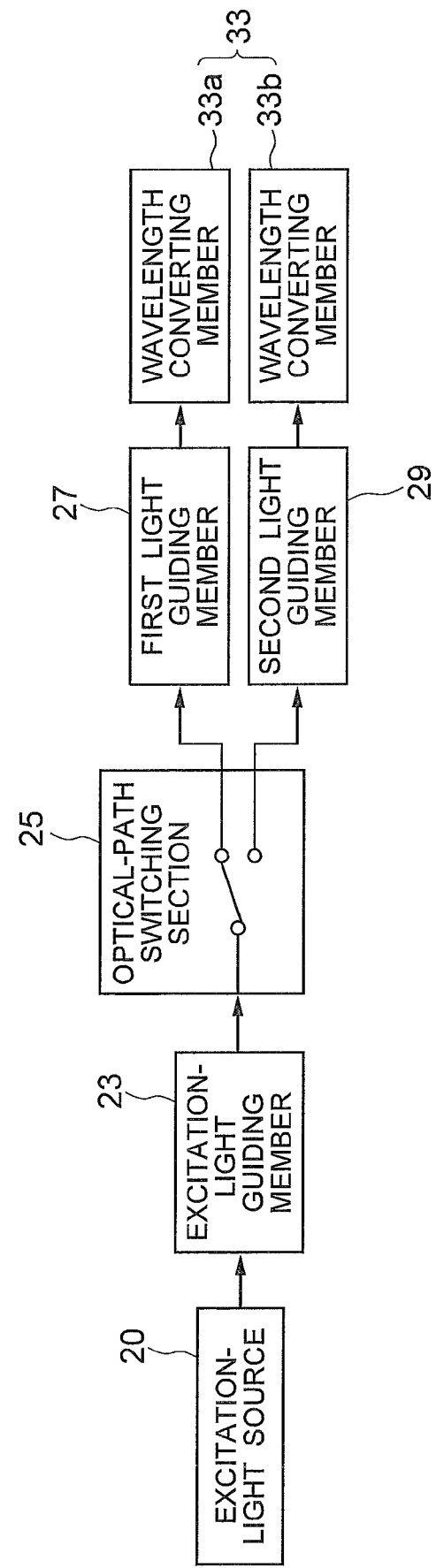
FIG. 14 is a block diagram showing principal sections of a light source apparatus according to a modified embodiment of the second embodiment of the present invention.
Figure 15:
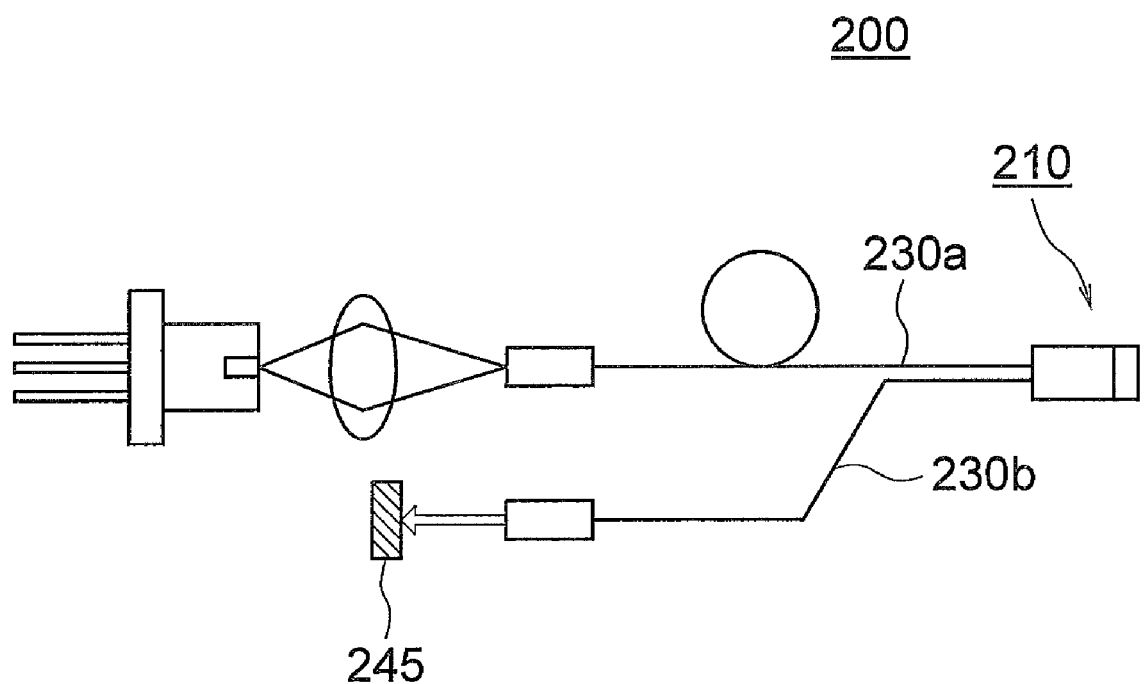
FIG. 15 is a block diagram showing a schematic structure of conventional light source apparatus is used.

Light Guiding Member and Wavelength Converting Member in One-to-One Relationship A modified embodiment of the second embodiment will be described below while referring to FIG. 14. FIG. 14 is a block diagram showing principal sections of a light source apparatus according to the modified embodiment of the second embodiment of the present invention.

The light converting member 33 (33a and 33b) as shown in FIG. 14, is provided to the excitation-light emergence end 27b of the first light guiding member 27 and the excitation-light emergence end 29b of the second light guiding member 29 respectively (refer to FIG. 12). In other words, the modified embodiment differs from the second embodiment at a point that one wavelength converting member is provided for one light guiding member. Accordingly, it is possible to separate positions of the respective wavelength converting members provided to the excitation-light emergence end 27b of the first light guiding member 27 and the excitation-light emergence end 29b of the second light guiding member 29, and a degree of freedom of designing is improved.

The light source apparatus according to the present invention is useful for various optical instruments which necessitate illumination.

The light source apparatus according to the present invention shows an effect that, even when the first light guiding member is degraded or disconnected, and cannot be used, by using upon switching to the second light guiding member, it is possible to guide the excitation light from the excitation-light source to the wavelength converting member, and it is possible to continue to illuminate the object to be illuminated without discontinuing using the light source apparatus, and without repairing or replacing.

What is claimed is:

1. A light source apparatus comprising:
  an excitation-light source;
  a first light guiding member and a second light guiding member which guide excitation light emitted from the excitation-light source;
  a wavelength converting member which is installed near an emitting end of excitation light from the excitation-light source of the first light guiding member and the second light guiding member, and which receives excitation light which has been guided by one of the first light guiding member and the second light guiding member, and emits a wavelength-converted light of a wavelength different from a wavelength of the excitation light;
  a first light receiving element which is installed near the wavelength converting member, and which directly or indirectly receives the wavelength-converted light of which, the wavelength is converted by the wavelength converting member; and an optical-path switching section which guides the excitation light to one of the first light guiding member and the second light guiding member according to an output of the first light receiving element.

2. The light source apparatus according to claim 1 further comprising:
a second light receiving element which simultaneously detects that the excitation light emitted by the excitation-light source can be guided by both the first light guiding member and the second light guiding member, wherein
the second light receiving element is disposed on an end side of one of the first light guiding members and the second light guiding member, on which the excitation light is incident, and
the second light receiving element which detects wavelength-converted light which is guided by one of the first light guiding member and the second light guiding member, which is not guiding the excitation light, upon the excitation light which is emitted from the excitation-light source and guided by one of the first light guiding member and the second light guiding member, is subjected to wavelength conversion by the wavelength converting member.

3. The light source apparatus according to claim 2, wherein the second light receiving element moves relatively with respect to the first light guiding member and the second light guiding member in conjunction with the optical-path switching section, and is disposed on an end side of one of the first light guiding member and the second light guiding member which is not guiding the excitation light emitted by the excitation-light source, on which the excitation light is incident.

4. The light source apparatus according to claim 2, comprising:
a warning section which warns that one of the first light guiding member and the second light guiding member has a defect; and
a warning control section which makes a judgment that at least one of the first light guiding member and the second light guiding member has a defect, from an output of at least one of the first light receiving element and the second light receiving element, and controls the warning section.

5. The light source apparatus according to claim 4, wherein the warning control section makes a judgment that at least one of the first light guiding member and the second light guiding member has a defect, when an intensity of light received by the second light receiving element is less than a predetermined value, and gives a warning by controlling the warning section.

6. The light source apparatus according to claim 4, wherein the warning control section makes a judgment that one of the first light guiding member and the second light guiding member which is not guiding the excitation light has a defect when an intensity of light received by the second light receiving element is less than a predetermined value, and an intensity of light received by the first light receiving element is not less than a predetermined value, and gives a warning by controlling the warning section.

7. The light source apparatus according to claim 4, wherein the warning control section makes a judgment that one of the first light guiding member and the second light guiding member which is guiding the excitation light has a defect, when an intensity of light received by the second light receiving element is less than a predetermined value, and an intensity of light received by the first light receiving element is less than a predetermined value, and gives a warning by controlling the warning section.

8. The light source apparatus according to claim 2, further comprising:
an optical-path switching control section which makes a judgment that one of the first light guiding member and the second light guiding member which is guiding the excitation light has a defect, when an intensity of wavelength-converted light received by the second light receiving element is less than a predetermined value, and an intensity of wavelength-converted light received by the first light receiving element is less than a predetermined value, and operates the optical-path switching section.

9. The light source apparatus according to claim 2, comprising:
a lens at an end portion of the first light guiding member and the second light guiding member, facing the wavelength converting member, which illuminates upon converging excitation light from the excitation-light source to an area on a surface of the wavelength converting member, and which makes wavelength-converted light emerged from the wavelength converting member incident on the first light guiding member and the second light guiding member.

10. The light source apparatus according to claim 2, wherein an excitation-light emerging end of the first light guiding member and an excitation-light emerging end of the second light guiding member are in contact near the wavelength converting member.

11. The light source apparatus according to claim 2, further comprising:
a leaked-light preventing section which prevents leaked light of the excitation light from the excitation-light source from being incident directly on the second light receiving element, at an optical-path switching connecting portion of the optical-path switching section.

12. The light source apparatus according to claim 11, wherein the optical-path switching connecting portion is a connecting portion of an excitation-light emerging end of the excitation-light guiding member and an excitation-light incidence end of one of the first light guiding member and the second light guiding member which is connected by the optical-path switching section.

13. The light source apparatus according to claim 11, wherein the optical-path switching connecting portion is a connecting portion of an excitation-light emerging end of the excitation-light source, and an excitation-light incidence end of one of the first light guiding member and the second light guiding member which is connected by the optical-path switching section.

14. The light source apparatus according to claim 11, wherein the leaked-light preventing section is a light shielding member which is disposed between the optical-path switching connecting portion and a light receiving portion of the second light receiving element, and which cuts off at least the excitation light.

15. The light source apparatus according to claim 11, wherein the leaked-light preventing section is a filter which is installed at a light receiving portion of the second light receiving element, and through which, wavelength of the wavelength-converted light is transmitted, but at least a wavelength of the excitation light is not transmitted.

16. The light source apparatus according to claim 1, comprising:
an optical-path switching control section which controls such that the first light guiding member and the second light guiding member are switched one after another by the optical-path switching section.

17. The light source apparatus according to claim 16, comprising:
- a warning section which gives a warning that one of the first light guiding member and the second light guiding member has a defect, and
- a warning control section which makes a judgment that one of the first light guiding member and the second light guiding member which is guiding the excitation light has a defect when an intensity of light received by the first light receiving element is less than a predetermined value, and controls the warning section to give a warning.

18. The light source apparatus according to claim 17, wherein
- the optical-path switching control section makes the first light guiding member and the second light guiding member guide light one after another, and outputs to the warning control section, connection information which indicates as to which one of the first light guiding member and the second light guiding member is guiding the excitation light, and
- the warning control section makes a judgment of whether or not an intensity of light received by the first light receiving element is less than a predetermined value for one of the first light guiding member and the second light guiding member which is guiding the excitation light, upon associating with the connection information from the optical-path switching control section, and gives a warning upon controlling the warning section for one of the first light guiding member and the second light guiding member which has been judged to have a defect.

19. The light source apparatus according to claim 16, further comprising:
- n–2 numbers of light guiding members (where, n is an integer not less than 3) having a function similar to a function of the second light guiding member, wherein
- the optical-path switching section guides the excitation light to one of the light guiding members from the first light guiding member to the nth light guiding member.

20. The light source apparatus according to claim 1, further comprising:
- n–2 numbers of light guiding members (where, n is an integer not less than 3) having a function similar to a function of the second light guiding member, wherein
- the optical-path switching section guides the excitation light to one of the light guiding members from the first light guiding member to the nth light guiding member.

21. The light source apparatus according to claim 1, wherein one of the first light guiding member and the second light guiding member is an optical fiber made of plastic.

* * * * *